Patented Apr. 3, 1928.

1,665,186

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

PROCESS OF MAKING SULPHUR-CONTAINING PLASTICS.

No Drawing.   Application filed February 25, 1926.  Serial No. 90,621.

This invention relates to an improved mode of making a molding composition comprising sulphur, ground wood, or wood flour, with or without starch or flour, or other farinaceous material, and also relates to molded products made therefrom, particularly containers such as mailing tubes, pill boxes, cigar boxes, and other receptacles.

The composition is preferably prepared by grinding together wood flour and sulphur in a ball mill, introducing starch at the same time, if this material is to form a component, and after a thorough mixture has been made water preferably is added to moisten the entire mass.

Such a composition when molded in a hot press under conditions which allow of the fairly free escape of water vapor yields a container or other molded article which is light in weight and somewhat porous, the porosity depending in a measure on the proportion of water employed.

The conditions of molding, that is, temperature and pressure, and length of time in the mold, also influence the appearance of the molded article. The distribution of pressure likewise is not without influence.

A composition within the scope of the present invention is made from 44 lbs. of wood flour, 24 lbs., of powdered starch and 14 lbs., of flowers of sulphur. This mixture was ground in the ball mill for two hours and then 50 lbs. of water were added. The addition of water was made in a mixer which thoroughly incorporated the water throughout the mass and afforded a product which was damp and coherent, but which when squeezed in the hand would not liberate water readily. This was placed in a box mold, that is a cavity mold fitted with a plunger and placed in an hydraulic press heated to about 200° C. On pressing for three minutes a box shaped structure was obtained, light in weight and of a faint yellow color, somewhat resembling wood, possibly having a slightly greater porosity.

Despite the fusibility of the sulphur it did not squeeze out of the mold and separate from the rest of the mass, but the molded article when taken from the press was surprisingly firm and not plastic as might be expected when employing a binder so easily softened by heat as sulphur.

Various substances may be introduced such as suitable colors, glycerine or calcium chloride to serve to retain moisture, other fillers known to the plastic arts including mineral fillers and organic fillers such as linters, flock, and the like. Oil of cedar, may be added, in some cases, to give the container a cedar-wood odor.

The proportion of wood flour, sulphur, starch and water in the above example may be varied considerably. The starch may be omitted in some cases. The flowing qualities are impaired, however, by the absence of the farinaceous material or fecula. The sulphur, it may be noted, in addition to its specific function as a binder tends to preserve the starchy material. The sulphur may have admixed with it other substances which modify its tendency to crystallize.

The property of the composition of stiffening or appearing to "set" under heat and pressure, as described, is important as this transformation enables the boxes, tubes, imitation lumber, to be handled soon after removal from the press, with little danger of deformation.

Products made by the present invention, as well as the process of molding the moistened mixture described herein, are claimed in my copending application Ser. No. 108,987, filed May 13, 1926.

What I claim is:—

1. The process which comprises grinding together wood flour and sulphur; adding water to moisten the mass, and hot pressing the moist material.

2. The process which comprises grinding together wood flour, sulphur, and starch, adding water to wet the mass, and hot pressing the moist material.

3. The process which comprises grinding together wood flour, sulphur, and starch, adding water to moisten the mass, and hot pressing while allowing the fairly free escape of water vapor.

4. The process which comprises grinding wood flour, sulphur and starch together, adding water in amount sufficient to make the mass damp and coherent, and hot pressing.

5. The process of making porous products which comprises grinding wood flour, sulphur and starch together, adding water thereto, and hot pressing, the porosity of the hot pressed product being controlled by varying the amount of water added prior to the hot pressing step.

CARLETON ELLIS.